United States Patent
van Dijk et al.

(10) Patent No.: US 8,752,156 B1
(45) Date of Patent: Jun. 10, 2014

(54) DETECTING SOFT TOKEN COPIES

(75) Inventors: Marten van Dijk, Somerville, MA (US);
Kevin D. Bowers, Melrose, MA (US);
Samuel Curry, Andover, MA (US);
Sean P. Doyle, Edmonds, WA (US);
Nikolaos Triandopoulos, Arlington, MA (US); Riaz Zolfonoon, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 123 days.

(21) Appl. No.: 13/435,848

(22) Filed: Mar. 30, 2012

(51) Int. Cl.
*H04L 29/06* (2006.01)

(52) U.S. Cl.
USPC .................................................. 726/9

(58) Field of Classification Search
None
See application file for complete search history.

(56) References Cited

U.S. PATENT DOCUMENTS

| | | | |
|---|---|---|---|
| 6,738,907 B1 | 5/2004 | Carter | |
| 2003/0159050 A1* | 8/2003 | Gantman et al. | 713/184 |
| 2004/0172535 A1* | 9/2004 | Jakobsson et al. | 713/168 |
| 2005/0166263 A1* | 7/2005 | Nanopoulos et al. | 726/7 |
| 2006/0041402 A1* | 2/2006 | Baker | 702/189 |
| 2007/0250923 A1 | 10/2007 | M'Raihi | |
| 2008/0044014 A1* | 2/2008 | Corndorf | 380/37 |
| 2011/0010552 A1 | 1/2011 | Hoornaert et al. | |

OTHER PUBLICATIONS

Juels et al., "Key Update With Compromise Detection," U.S. Appl. No. 13/250,225, filed on Sep. 30, 2011.

* cited by examiner

*Primary Examiner* — David Pearson
(74) *Attorney, Agent, or Firm* — BainwoodHuang

(57) ABSTRACT

A technique for detecting unauthorized copies of a soft token that runs on a mobile device includes generating a set of random bits on the mobile device and providing samples of the set of random bits, as well as token codes from the soft token, for delivery to a server during authentication requests. The server acquires the set of random bits of the mobile device, or learns the set of random bits over the course of multiple login attempts. Thereafter, the server predicts values of the samples of the set of random bits and tests actual samples arriving in connection with subsequent authentication requests. Mismatches between predicted samples and received samples indicate discrepancies between the random bits of the device providing the samples and the random bits of the mobile device, and thus indicate unauthorized soft token copies.

22 Claims, 8 Drawing Sheets

DETECTING SOFT TOKEN COPIES

BACKGROUND

Computer networks, such as those available at a workplace, university, or other organization, are often configured to provide remote access to users through virtual private networks (VPNs), customized network settings, and/or other technologies. Users must typically authenticate to remote networks before being granted access. Authentication may involve users providing various authentication factors, such as user IDs, passwords, token codes, and personal identification numbers (PINs). In a typical scenario, a user submits an authentication request containing one or more authentication factors to an authentication server. The authentication server receives the request and either grants or denies network access to the user based on whether the submitted authentication factors match expected values.

A common authentication scheme involves the use of token codes. Token codes, also known as one-time passwords, or "OTPs," are generated automatically, such as by portable devices (i.e., "hard tokens"), which may be distributed to users. An example of a hard token is the SecureID® token code generator, which is available from RSA Security Inc., of Bedford, Mass. Recently, software has been developed to perform the functions of hard tokens on smart mobile devices, such as smart phones, PDAs, and tablets. Like hard tokens, these "soft tokens" generate token codes at regular intervals. Token codes generated by a soft token are displayed on a display screen of a user's smart mobile device. A user may read a token code and enter the token code manually into a login screen presented on the user's computer. The user's computer then forwards the token code, along with any additional authentication information, to the authentication server, which either grants or denies access to the user.

Occasionally, users of soft tokens wish to make copies of their softs token for use on different mobile devices. To address this need, an approach has been developed for allowing users to copy, or "clone," their soft tokens from one mobile device to another.

SUMMARY

Soft tokens typically operate based on seeds, where each seed is unique. In a common scenario, seeds are dispensed to enterprises in the form of seed records, i.e., lists of seeds. A user may install a soft token as an application on the user's mobile device. When the user initializes the soft token, e.g., during a first login attempt, a seed from the seed record is allocated to the user and provisioned to the soft token on the user's mobile device. The user's soft token can henceforth generate token codes derived from the allocated seed, and the user may employ the token codes for logging on to a remote network.

Seed records can be subject to theft or loss. If an enterprise's seed record falls into the hands of a malicious attacker, the attacker may install a soft token application on a mobile device and attempt to log on to the enterprise's network using seeds from the seed record. For example, attackers may guess the credentials of a particular authorized user and try logging on to the network with the authorized user's credentials and token codes obtained from different seeds of the stolen seed record. If the attacker tries many different seeds from the seed record, the attacker may eventually succeed at gaining access to the remote network and the potentially valuable resources it contains. Unfortunately, prior authentication systems are vulnerable to this type of attack because they have no way of distinguishing token codes of authorized users from token codes of attackers.

In contrast with the prior approach, a technique for detecting unauthorized copies of a soft token that runs on a mobile device includes generating a set of random bits on the mobile device and providing samples of the set of random bits, as well as token codes from the soft token, for delivery to a server during authentication requests. The set of random bits is reasonably specific to the mobile device and can be used to distinguish the mobile device from other devices. The server acquires the set of random bits of the mobile device, or learns the set of random bits over the course of multiple login attempts. Thereafter, the server predicts values of the samples of the set of random bits and tests actual samples arriving in connection with subsequent authentication requests. Mismatches between predicted samples and received samples indicate discrepancies between the random bits of the device providing the samples and the random bits of the mobile device, and thus indicate unauthorized soft token copies.

When the above technique is implemented, malicious attackers may try logging on to a remote network with many different seeds from a seed record, but with each seed they try, their probability of being detected increases. Some fraction of the seeds of the seed record will already have been dispensed and will be in use, so the attacker's chances of avoiding detection decrease rapidly with the more seeds they try. Faced with this defense, hackers may try using a small number of seeds, in hopes that they will get lucky and pick ones that have not already been dispensed. They may try using the same couple of seeds over and over, and their repeated unsuccessful login attempts will make then vulnerable to detection by other server defenses.

Certain embodiments are directed to a method for detecting unauthorized copies of a soft token that runs on a mobile device. The method includes receiving, from a user, multiple authentication requests including token codes generated by the soft token, and receiving, from the mobile device and in connection with the authentication requests, multiple samples of a set of random bits. The method further includes generating multiple predicted samples of the set of random bits based on at least one sample of the set of random bits previously received from the mobile device, and testing whether the received samples of the set of random bits match the predicted samples of the set of random bits. The method still further includes identifying the use of an unauthorized soft token copy in response to the testing indicating that the received samples of the set of random bits do not match the predicted samples of the set of random bits.

Certain other embodiments are directed to a method for enabling detection of unauthorized copies of a soft token that runs on a mobile device. The method includes storing a seed value shared with a server, generating a set of random bits, and subjecting one of (i) the seed value and (ii) a value derived from the seed value and the set of random bits to a forward secure function to produce a multi-bit value. The method further includes storing state information on the mobile device indicating that the forward-secure function has been run. The method still further includes generating multiple samples of the multi-bit value, generating multiple token codes, and providing the token codes and samples for transmission to the server in connection with multiple authentication requests.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

A technique for detecting unauthorized copies of a soft token that runs on a mobile device includes generating a set of random bits on the mobile device and providing samples of the set of random bits, as well as token codes from the soft token, for delivery to a server during authentication requests. The server acquires the set of random bits of the mobile device, or learns the set of random bits over the course of multiple login attempts. Thereafter, the server predicts values of the samples of the set of random bits and tests actual samples arriving in connection with subsequent authentication requests. Mismatches between predicted samples and received samples indicate discrepancies between the random bits of the device providing the samples and the random bits of the mobile device, and thus indicate unauthorized soft token copies.

Figure 1:
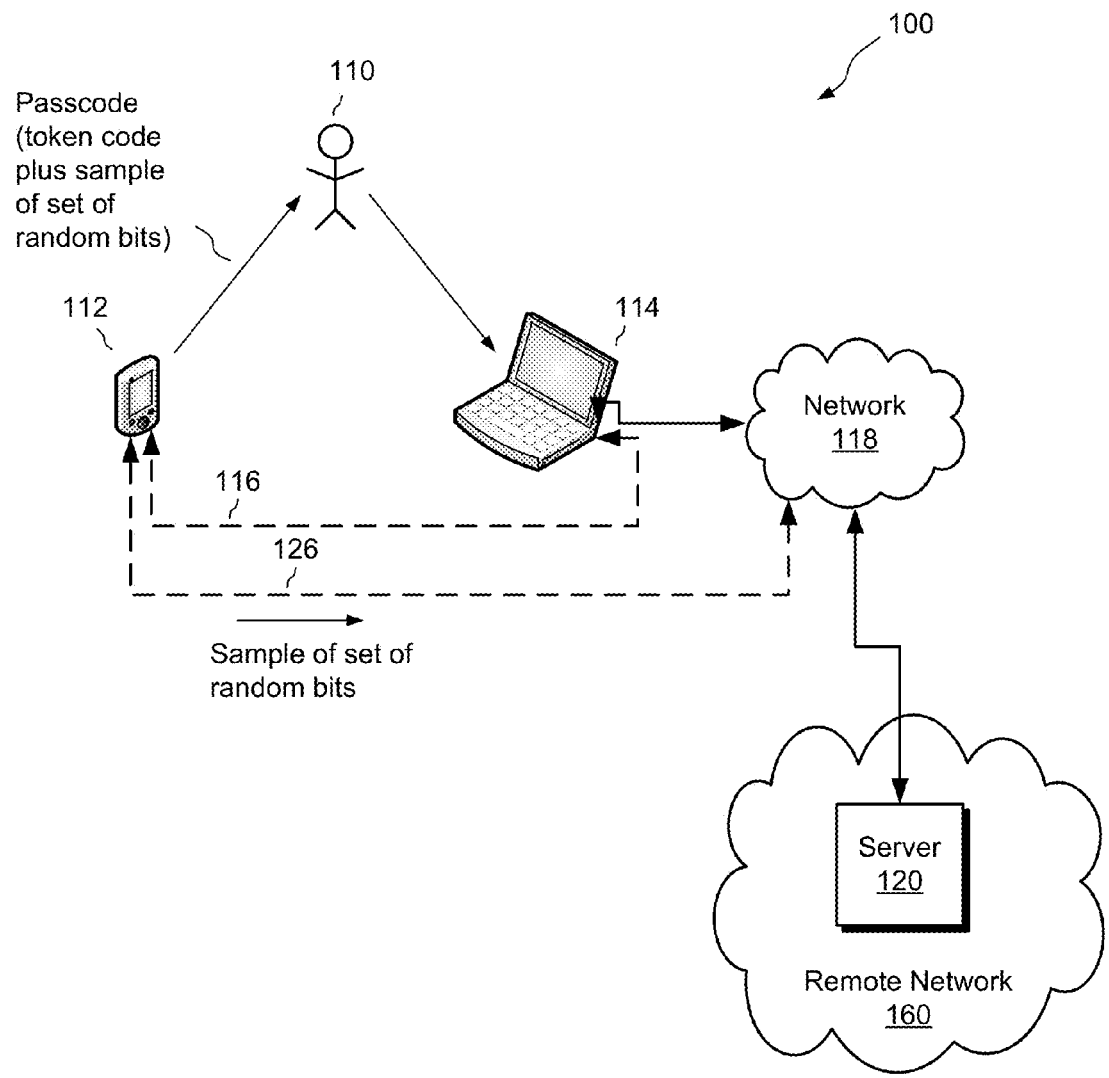
FIG. 1 is a block diagram showing an example environment in which unauthorized copies of soft tokens can be detected.

FIG. 1 shows an example environment 100 in which a technique for detecting unauthorized copies of soft tokens may be implemented. As shown in FIG. 1, a user 110 has access to a mobile device 112 and a computing machine 114. The computing machine 114 is connected, via a network 118, to a server 120 on a remote network 160. A communication medium 116, such as a cable or wireless connection, is provided to allow the mobile device 112 to communicate with the computing machine 114. In addition, a communication medium 126 is provided to enable high bandwidth communication between the mobile device 112 and the server 120. In some examples, the communication medium 126 is a wireless medium, such a cell phone network or Wi-Fi network, for example.

The mobile device 112 includes a soft token, which generates token codes on a regular basis, such as once per minute. To enable detection of unauthorized soft token copies, the mobile device 112 collects and stores a set of random bits. The random bits may be generated in any suitable way, such as with a random number generator running on the mobile device 112, by measuring and hashing a software posture or hardware fingerprint of the mobile device 112, by hashing user biometrics, by receiving user input, by a combination of the foregoing, or by any number of other means, for example. The resulting set of random bits is thus reasonably unique to the mobile device 112. In one example, the set of random bits is 16 bits long. Thus, on average, only one mobile device 112 in 65,536 will have the same set of random bits.

The relative uniqueness of the set of random bits allows the mobile device 112 to distinguish itself from devices of attackers running soft token copies (e.g., counterfeit soft tokens configured with the same seed as was provisioned to the device 112). During authentication requests, the mobile device 112 supplies not only token codes but also samples of its set of random bits. In some examples, the samples are encrypted versions of the set of random bits. In other examples, the samples are individual bits or groups of bits, which are computed from the set of random bits. The server 120 can be configured to check the samples of the set of random bits and identify inconsistencies. Although attackers may succeed in obtaining the token seed of the user 110 (e.g., from a stolen seed record), the attacker will not know the specific random bits of the device 112. At best, the attacker can only guess the random bits, and will almost certainly guess wrong.

In some examples, the samples of the set of random bits are transmitted to the server 120 via the communication medium 126 and the network 118. In other examples, the samples of the set of random bits is transmitted to the computing device 114 via the communication medium 116, and then relayed to the server 120 via the network 118.

In another example, the samples of the set of random bits are blended (e.g., via a reversible blending operation) with respective token codes from the soft token to generate passcodes, which the mobile device 112 displays to the user 110 on a display of the mobile device 112. The user 110 may read a passcode and manually copy it into a field displayed on a login screen on the computing machine 114. Optionally, the user 110 may enter additional information, such as a user ID, Personal Identification Number (PIN), and/or other authentication factors. The user 110 may then submit an authentication request to the server 120, using the passcode and, if provided, other authentication factors. The server 120, upon receiving the authentication request from the computing machine 114, extracts from the passcode the submitted token code and the sample of the set of random bits (e.g., using a reverse blending operation). The server 120 may then apply the token code in authenticating the user, and may apply the sample of the set of random bits to determine whether the soft token is authentic.

Regardless of the path over which the server 120 receives a sample of the set of random bits, if the sample does not match a predicted value the server 120 may suspect that the soft token is a counterfeit. Under these circumstances, the server 120 may revoke the token (i.e., deny authentication requests using the soft token or any copies thereof). Alternatively, the server 120 may force the suspect user to log on to a server specially configured to observe the suspect user's activities (e.g., a hacker VPN or honeypot), thereby learning the methods and means of the suspect user, while also protecting the resources of the remote network 160.

It is understood that the mobile device 112 can be any hand-held or portable device, including, for example, a smart phone, PDA, tablet computer, or portable computer (e.g., a laptop). The computing machine 114 can also be any type of computing machine, such as a laptop computer, desktop computer, server, virtual machine, tablet, smart phone or PDA. The network 118 is generally a public network. The network 118 may include a Local Area Network (LAN), a Wide Area Network (WAN), a cellular phone network, a virtual network, the Internet, some other network, or any combination of the foregoing, for example. The server 120 is typically a Virtual Private Network (VPN) server. The server 120 typically includes an authentication server or has access to an authentication server. It is understood that the server 120 may include one or more computers operating in coordination to provide users with access to the remote network 160.

Figure 2:
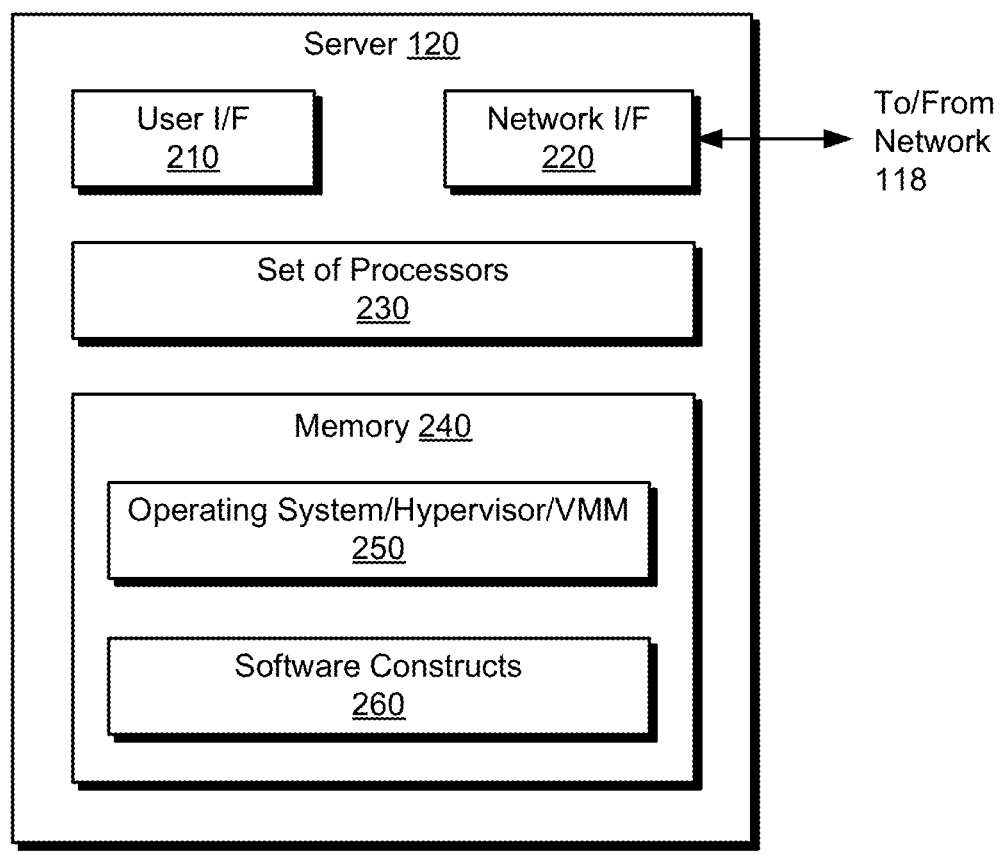
FIG. 2 is a block diagram of a server of FIG. 1.

FIG. 2 shows an example server 120 in greater detail. Here, it is seen that the server 120 includes a user interface 210 and a network interface 220. In an example, the user interface 210 includes a keyboard, pointer, and display, and the network interface 220 includes one or more network interface cards (NICs) for connecting to the network 118. The server 120 also includes a set of processors 230 (e.g., one or more processing chips and/or assemblies) and memory 240. It is understood that the set of processors 230 and the memory 240 together form a specialized circuit that is constructed and arranged for performing various functions and processes as described herein.

The memory 240 includes both volatile memory (e.g., RAM) and non-volatile memory (e.g., a disk drive) and stores instructions for running an operating system 250 and various software constructs 260. The server 120 may be provided in the form of a physical machine or a virtual machine. If provided as a virtual machine, the operating system 250 may be used in connection with a hypervisor and/or a virtual memory manager.

Figure 3:
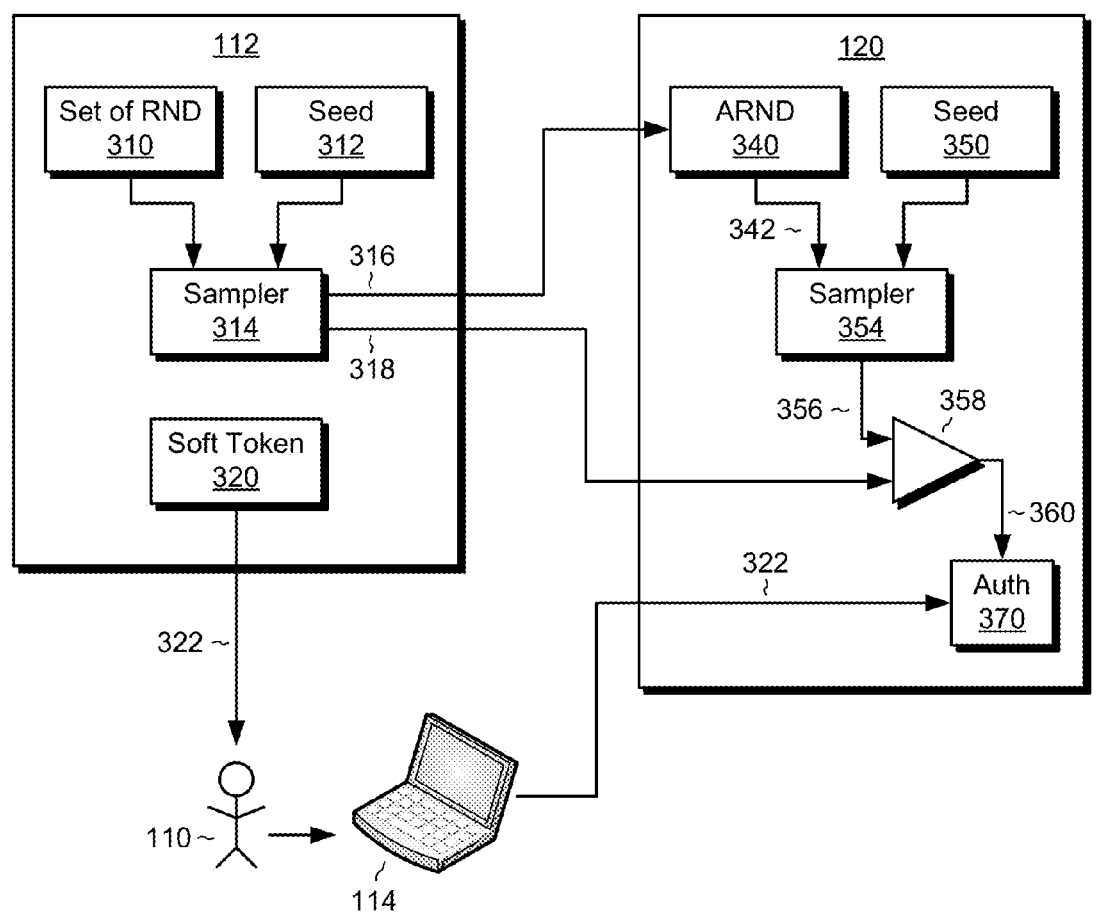
FIG. 3 is a block diagram of portions of the example environment of FIG. 1, wherein a mobile device of FIG. 1 can directly communicate with the server to convey random bit samples to the server.

FIG. 3 shows portions of the environment of FIG. 1, with the mobile device 112 and server 120 configured in example arrangements for detecting soft token copies. As shown, the mobile device 112 includes the set of random bits 310 and a seed 312. The seed 312 may be the same as the token seed provisioned to the mobile device 112, or it may be a different seed. The seed 312 may also be a value derived from a seed earlier provisioned to the mobile device 112. The mobile device 112 also includes a sampler 314 and a soft token 320. The soft token 320 generates token codes 322 on a regular basis. The token codes 322 are displayed on a display of the mobile device 112, where the user 110 may read the token codes, enter them on the computing machine 114, and submit them to the server 120 as parts of authentication requests.

The sampler 314 receives the set of random bits 310 and the seed 312. Initially, e.g., during an initialization procedure, the sampler 314 may convey an encrypted version of the set of random bits 310 to the server 120, which the server 120 can use in testing samples received during subsequent authentication requests. During each such authentication request, the sampler 314 provides a sample 318 in connection with the request. In various examples, the sample 318 is a 1-bit sample, a multi-bit sample, or a sample (e.g., an encrypted value) of the entirety of the set of random bits 310.

The server 120 includes various software constructs 260, which include, in the illustrated example, an acquired set of random bits 340, a seed 350, a sampler 354, a comparator 358, and an authentication engine 370. The acquired set of random bits 340 stores the bits 316 (or rather, a decrypted version thereof), and the seed 350 is the same as the seed 312.

During operation, the user 110 reads a token code 322 from the mobile device 112, enters the token code 322 into a login field displayed on the computing machine 114, and submits an authentication request to the server 120. The server 120 receives the authentication request and sends the token code 322 to the authentication engine 370. In response to receiving the authentication request, the server 120 sends a message to the mobile device 112 requesting a sample 318 of the set of random bits. In response to the message, the mobile device 112 provides the requested sample 318 (e.g., via the medium 126 and network 118 or via a path including the medium 116, the computing machine 114, and the network 118).

On the server 120, the sampler 354 generates a predicted sample 356 based on the acquired set of random bits 340. The sample 356 thus provides a predicted value of the sample 318 received from the mobile device 112. The comparator 358 receives the predicted sample 356 as well as the requested sample 318. As long as the set of random bits 310 on the mobile device 112 matches the acquired set of random bits 340 on the server 120, the predicted sample 356 should match the respective received sample 318. The comparator 358 compares the received sample 318 with the predicted sample 356 to test whether the samples match. The comparator 358 outputs a match signal 360 to the authentication engine 370, which indicates a match or no-match condition. If the signal 360 indicates no match, then the server 120 may treat the soft token as fraudulent and the authentication engine 370 may take action in accordance with its policy. For example, the authentication engine 370 may block future access from the soft token 320 or any copies thereof.

The example of FIG. 3 assumes that direct communication (e.g., over the network 118) takes place between the mobile device 112 and the server 120. Such communication is not always available, however. In addition, enhanced security may be improved by limiting such communication.

Figure 4:
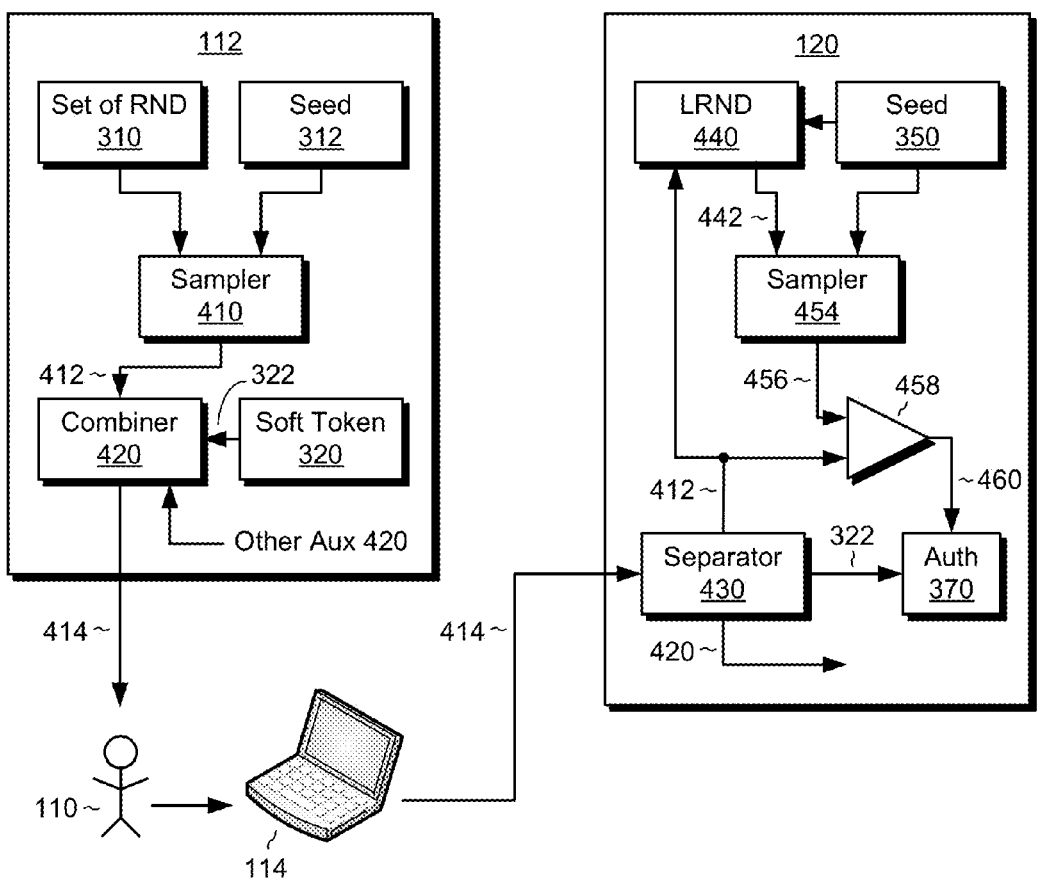
FIG. 4 is a block diagram of portions of the example environment of FIG. 1, wherein the mobile device of FIG. 1 conveys random bit samples to the server using passcodes displayed by the mobile device and submitted to the server as parts of authentication requests by the user of FIG. 1.

FIG. 4 shows an alternative arrangement of portions of the environment of FIG. 1, with the mobile device 112 and server 120 configured in an alternative manner for detecting soft token copies. Here, the mobile device 112 includes a sampler 410, which is not required to communicate directly with the server 120. Rather, samples 412 derived from the set of random bits 310 and the seed 312 are provided to a combiner 420, which combines the samples 412 with token codes 322 from the soft token 320 to produce passcodes 414. Each passcode 414 thus includes a token code 322 and a sample 412 of the set of random bits 310. Preferably, the combiner 420 applies a reversible blending operation on the token code 322 and sample 412, to obfuscate their positions and/or values in the passcode 414. The mobile device 112 displays the passcode 414, and the user 110 can read the passcode and enter it into a login screen of the computing machine 114. The user 110 can then submit an authentication request, and the passcode 414, including the token code 322 and the sample 412, is conveyed to the server 120 (e.g., over the network 118).

Although it is shown that the combiner 420 receives only samples 412 to combine with token codes 322, it is understood that the combiner 420 may receive other bits as input, as well. In some examples, the sample 412 is one or more of multiple auxiliary bits, and the combiner 420 operates to combine other auxiliary bits 420, as well as the auxiliary bit storing the sample 412, with token codes 322. In one example, each sample 412 is one bit long, and a total of four auxiliary bits are provided. The remaining three auxiliary bits 420 can be used for conveying other information from the mobile device 112 to the server 120.

At the server 120, a separator 430 receives the passcode 414 and extracts the token code 322 as well as the sample 412 (e.g., using a reverse blending operation). If additional auxiliary bits 420 are provided, such bits are extracted as well. Of note, the sample 412 has two destinations, a comparator 458 and a learning engine 440. In an example, the learning engine 440 stores a learned sequence of random bits. Although the set of random bits 310 is provided directly to the server 120 in the example of FIG. 3, here no such provision is made and the server 120 instead learns the set of random bits 310 over the course of multiple authentication requests. The learning engine 440 thus assembles a rendition of the set or random bits 310 based on samples obtained over time.

In this arrangement, the server 120 may employ both a learning mode and a detection mode, where the server 120 uses an initial set of authentication requests to learn the set of random bits 310. Once the bits are learned, the server 120 may switch over to the detection mode, where mismatches between received samples 412 and predicted samples may be interpreted as login attempts from unauthorized soft tokens, e.g., as malicious attacks.

Figure 5:
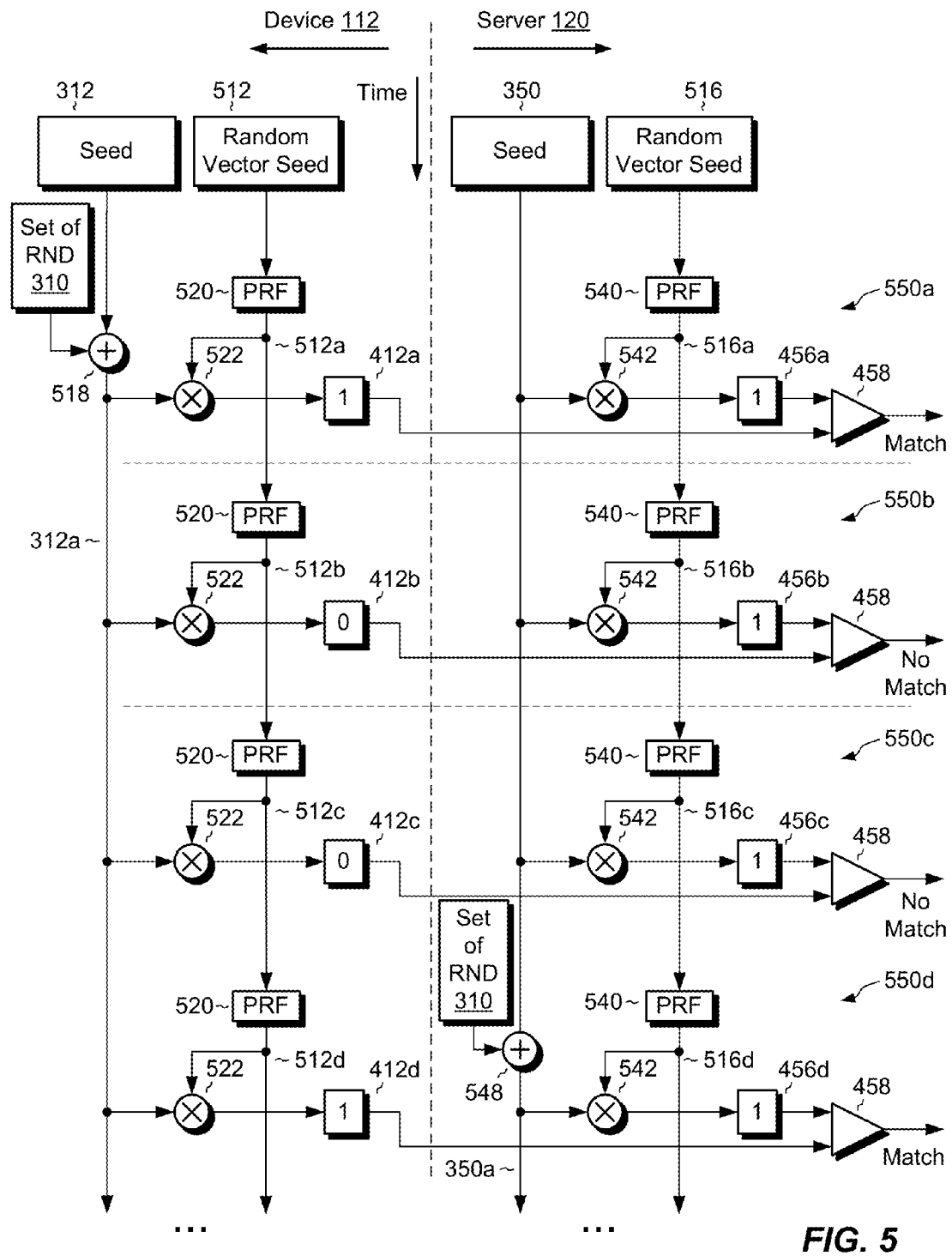
FIG. 5 is a sequence block diagram showing example techniques for sampling a set of random bits on both the mobile device and the server and testing samples against expected values predicted on the server in an arrangement like that shown in FIG. 4.

FIG. 5 shows an example sequence of activities occurring at both the mobile device 112 and at the server 120. As indicated in FIG. 5, the mobile device 112 and the server 120 are both provisioned with a seed 312/350 and a random vector seed 512/516. The seeds 312 and 350 are identical to each other. The random vector seeds 512 and 516 are also identical to each other. In one example, the seed 312/350 and random vector seed 512/516 are each 64-bit values. Although the random vector seed 512/516 may be publicly known, the seed 312/350 is generally retained as a secret.

Operation will now be described with reference to different time frames 550a-550d. Each timeframe 550a-550d represents an interval of time during which respective passcodes 414 are generated by the mobile device 112. For simplicity, it is shown that each passcode 414 created is sent to the server 120. Those skilled in the art will recognize, however, that the server 120 typically will not receive each passcode 414 generated, but rather can remain synchronized with the mobile device 112 by "fast-forwarding" through different timeframes, employing jump tables, or using other known techniques.

As part of an initialization procedure on the mobile device 112, the seed 312 is combined via a combiner 518 with the set of random bits 310 to produce an updated seed value 312a. The combiner 518 may operate in any suitable way. For example, the combiner 518 may add the set of random bits 310 to the seed 312, perform a logical operation between the random bits 310 and the seed 312 (such as XOR), perform a hash function, perform another operation, or any combination of the foregoing, for example.

For each passcode 414 produced by the mobile device 112, the updated seed value 312a is sampled. As shown in timeframe 550a, sampling is initiated by subjecting the random vector seed 512 to a pseudo-random function (PRF) 520 to generate a pseudo-random signal 512a. An inner product multiplier 522 then calculates the modulo-2 of the inner product of the pseudo-random signal 512a and the updated seed value 312a. The result of the inner product is a single bit sample 412a. The combiner 420 may include this sample 412a as one of the auxiliary bits, which are combined with a token code 322 to produce a passcode 414.

If the passcode 414 is used as part of an authentication request (as shown in this example), the passcode 414 is transmitted to the server 120, where the auxiliary bits are extracted, including the sample 412a.

A similar process takes place at the server 120, except that no random bits 310 are combined with the seed value 350. During this initialization process, the server 120 enters a learning mode in which mismatches between received samples 412 and predicted samples 456 are expected. Here, the random vector seed 516 is subjected to a pseudo-random function (PRF) 540 to generate a pseudo-random signal 516a. The pseudo-random function 540 is identical to the pseudo-random function 520. An inner product multiplier 542 calculates the modulo-2 of the inner product of the pseudo-random signal 516a and the seed 350. The result of the inner product is a predicted sample 456a. The server 120 then compares (e.g., using comparator 458) the predicted sample 456a with the received sample 412a obtained from the passcode 414. The result of the comparison is applied to the learning engine 440.

Back at the mobile device 112, no further random bits are added to the updated seed value 312a during immediately succeeding timeframes, and samples 412 of the updated seed value 312a continue to be acquired and transmitted to the server 120 via passcodes 414 for comparison with respective predicted samples 456. Owing to the pseudo-random functions 520, different parts of the seed 312 are sampled and transmitted to the server 120. Results of comparisons continue to be fed to the learning engine 440. It is expected that, during this initial learning mode, samples 412 received at the server 120 will only randomly match predicted samples 456 at first, but after multiple timeframes, through operation of the learning engine 440, predicted samples 456 will match received samples 412. Once this point is reached, the server 120 may switch from learning mode to detection mode, whereupon mismatches between received samples 412 and predicted samples 456 may indicate use of a counterfeit soft token.

The learning engine 440 may operate according to any of numerous techniques. In one example, the learning engine 440 includes a model of the combiner 518, used by the mobile device 112 to combine the seed 312 with the set of random bits 310. The learning engine 440 may simulate different results produced by the combiner 518 in response to receiving different sets of random bits 310 and the seed 312. A table can be constructed in memory, which stores, in one column, all possible candidates for the set of random bits 310 (e.g., all 65,536 candidates, assuming 16 random bits) and stores, in another column, the output of the simulated combiner 518 that corresponds to each respective candidate. Each time the comparator 458 produces a result, the learning engine 440 removes candidates from the table that could not possibly produce that result. As more passcodes 414 are received, more and more candidates are removed from the table, until a single candidate remains. The remaining candidate specifically identifies the set of random bits 310. As the learning engine 440 can detect when it has identified a single remaining result, the learning engine 440 may inform control processes on the server 120 immediately that the server 120 should switch from learning mode to detection mode.

Once the server 120 has identified the set of random bits 310, the server 120 may combine the set of random bits 310 with the seed 350 (e.g., via a combiner 548 having the same properties as the combiner 518) to produce an updated seed value 350a. The updated seed value 350a is then used as a baseline for subsequent samples (e.g., 456d and so on).

Thereafter, the server 120 may interpret mismatches between predicted samples 456 and received samples 412 as indications of counterfeit tokens.

It is understood that the combination of bits 310 with the seed 350 via the combiner 548 is shown at timeframe 550d for ease of illustration. Typically, several more passcodes 414 will be needed to identify the set of bits 310.

In some examples, temporary mismatches are permitted, even during detection mode, to account for the creation of legitimate, authorized soft token copies. Often, a user may own different mobile devices and may wish to install a copy of the user's allocated soft token on a second device or even a third device. If permitted by the organization issuing the token, the user may run a cloning procedure in which the mobile device 112 transfers token information to a second device.

To alert the server 120 that an authorized soft token copy has been made, the mobile device 112 may combine some extra bits with the updated seed value 312a before copying the result to the second device. The extra bits can truly random bits, pseudo random bits, results of a hash function, or other bits. For example, the updated seed value 312a may be provided to a combiner (not shown), for combining some extra bits to the updated seed value 312a, in the same manner that combiner 518 combines the set of random bits 310 with the seed 312. A twice updated seed value (not shown) may thus be produced.

Thereafter, the mobile device 112 will sample the resulting twice updated seed value, and the second device will obtain the twice updated seed value as the baseline for its own sampling operations. Thus, the mobile device 112 and the second device will operate substantially in parallel, producing the same token codes as well as the same samples.

The server 120, when it receives samples from either the mobile device 112 or the second device, will quickly identify a mismatch, as the server 120 has not yet been informed of the extra bits. But rather than immediately concluding that malicious activity has taken place, the server 120 may instead cautiously allow authentication for a few more logins, while closely supervising the user's activities. When the server 120 identifies the mismatch, the server 120 invokes the learning engine 440 for learning the newly added bit pattern, using a technique similar to that described above. If the learning engine 440 identifies a clear bit pattern after the server 120 receives a few more login attempts, the server 120 will adapt its predicted samples 456 to account for the new pattern (e.g., by combining the newly identified bits with the updated seed value 350a to create a twice updated seed value. Thereafter, subsequently received samples 412 should match predicted samples 456. However, if the learning engine 440 cannot identify a clear bit pattern after a few login attempts, malicious activity may be confirmed.

In some examples, the newly added bits are only 2 or 3 bits long. This number of bits is enough to alert the server 120 that a clone has been made, but is small enough so as not to require an extended learning period and therefore to reduce the window of uncertainty as to whether malicious activity is occurring.

In some examples, the mobile device 112 may use other auxiliary bits 420 to help the server 120 to resolve uncertainty when mismatches occur. For instance, one or more of the other auxiliary bits 420 may include a designation, which can be read by the server 120, to indicate whether a soft token clone has been made. Such designations are not necessarily trustworthy, however, if the mobile device 112 has been compromised.

In certain examples, trustworthiness of auxiliary bits may be enhanced through the use of a silent alarm channel, which may be implemented, for instance, with a single silent alarm bit. The silent alarm bit appears to vary randomly. Yet, it follows a specific pattern that allows the mobile device 112 silently to communicate suspect activity to the server 120. If the silent alarm is triggered, the server 120 detects the triggered state and can respond. In an example, the silent alarm bit is one of the auxiliary bits embedded in the passcodes 414. The silent alarm bit is thus bound to the remaining auxiliary bits and can therefore be used directly as an indicator of trust in those remaining auxiliary bits.

Thus, where one of the auxiliary bits is a silent alarm bit, the server 120 may read the silent alarm bit and, if the silent alarm bit is not triggered, the server 120 may trust information conveyed in one or more other auxiliary bits indicating that the soft token has been copied. Conversely, if the silent alarm bit has been triggered, the server 120 may strongly suspect malicious activity, and may attribute any contemporaneous mismatch between a received sample 412 and a predicted sample 456 to a counterfeit token.

The other auxiliary bits 420 may be used for other purposes related to soft token copying. For example, these bits may be used to establish how many copies of the soft token 320 have been made. For instance, these bits may be toggled on different logins to increment a monotonic counter on the server 120.

In further examples, the silent alarm bit itself may be used to convey the samples 412. The silent alarm bit can thus be used both for sampling the set of random bits 310 and for conveying triggers that indicate malicious activity.

Figure 6:
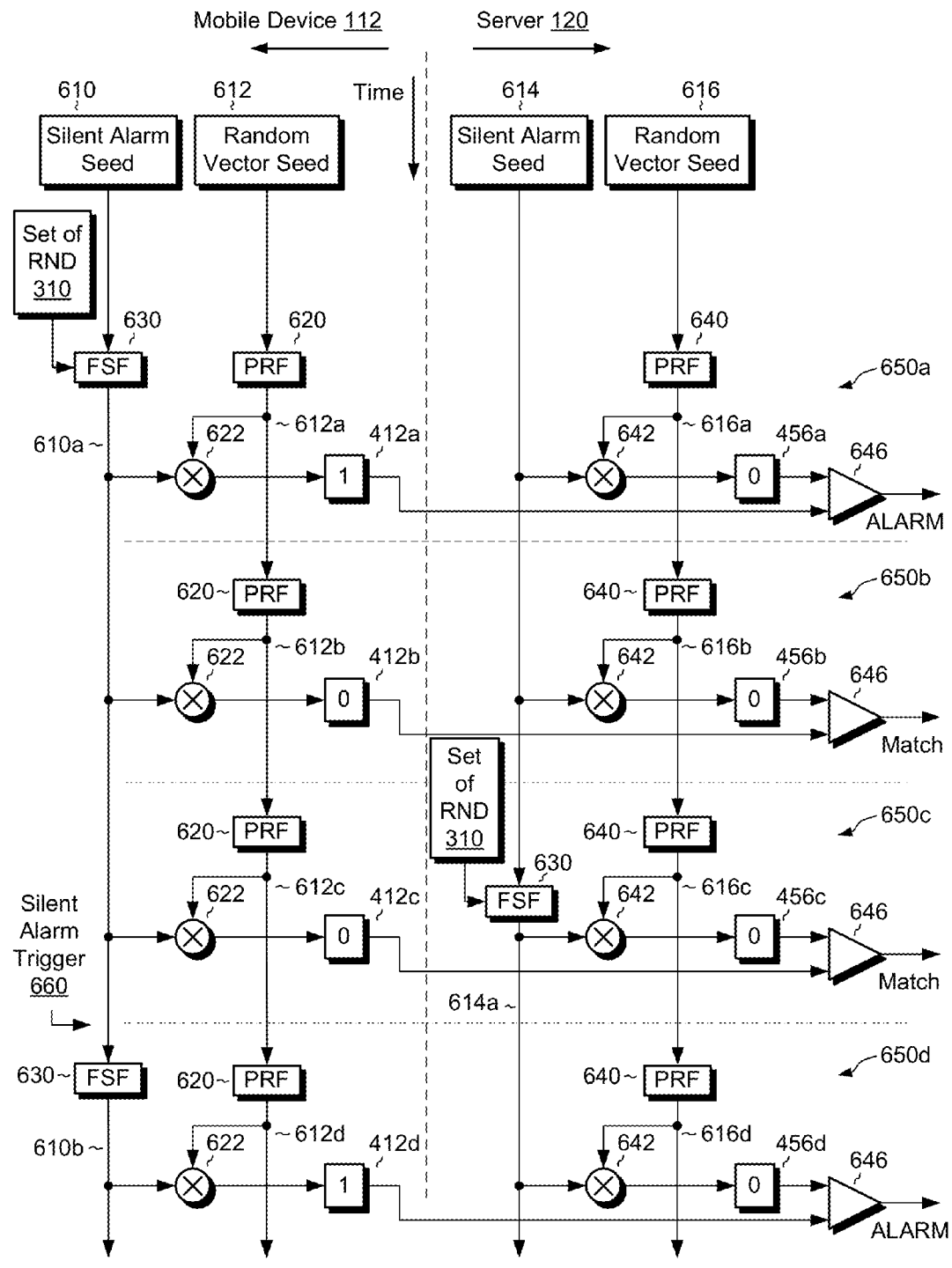
FIG. 6 is a sequence block diagram showing example techniques for using a silent alarm channel for sampling a set of random bits on both the mobile device and the server and testing samples against expected values predicted on the server in an arrangement like that shown in FIG. 4.

FIG. 6 shows an example sequence of activities occurring at both the mobile device 112 and at the server 120, where samples 412 from the mobile device 112 are conveyed in a silent alarm bit. The arrangement of FIG. 6 is similar to that of FIG. 5, except that the combiner 518 of FIG. 5 is replaced by a forward secure function (FSF) 630. The FSF 630 is an irreversible function, i.e., once the FSF 630 generates an output, the input cannot thereafter be recovered. In this example, the mobile device 112 and the server 120 are both provisioned with the same silent alarm seed 610/614, and are also provisioned with the same random vector seed 612/616.

During an initialization of the soft token 320 on the mobile device 112, the silent alarm seed 610 and the set of random bits 310 are provided as input to the FSF 630, which operates to create an updated seed value 610a. The updated seed value 610a is thus based on the set of random bits 310, with subsequent samples 412 of the updated seed value 610 depending on the set of random bits 310. Samples 412 are computed as the modulo-2 of the inner product of the updated seed value 610a with a random vector, i.e., successive iterations 612 of the pseudo random function (PRF) 620. Owing to the randomizing nature of the PRF 620, different parts of the updated seed value 610a tend to be sampled over the course of different timeframes 650a-d. Samples 412 are conveyed to the server 120 via passcodes 414. Operation on the mobile device 112 then proceeds essentially as described in connection with FIG. 5 above.

On the server 120, a mismatch is detected almost immediately, i.e., generally on the first or second sample (as there are only two possible values for each sample 412, so there is always a 50% chance of a random match). Ordinarily, any mismatch between predicted and received silent alarm bits is interpreted as an alarm, i.e., suspicion of malicious activity. Here, however, the server 120 detects the first use of the soft token 230 and temporarily suspends alarm operation. In response the detection of first use, the server 120 enters a learning mode and activates the learning engine 440.

The learning engine 440 includes a model of the FSF 630, and may construct a table relating candidates for the set of random bits 310 (e.g., all 65,536 of them) in one column with corresponding outputs of the FSF 630 in another column. The outputs of the FSF 630 are those that result from the FSF 630 receiving as input each candidate for the set of random bits 310 and the silent alarm seed 614. As additional samples 412 arrive from the mobile device, the learning engine 440 eliminates candidates from the table until, after several login attempts are received, the learning engine 440 pares down the table to a single remaining candidate.

With a single candidate identified, the server 120 updates the silent alarm seed 614 and resumes detection mode. The silent alarm seed is updated by subjecting the seed 614, along with the learned random bits 310, to the FSF 630 (i.e., the same FSF 630 as was used on the mobile device 112 and modeled in the learning engine 440). In the example shown, the updating operation occurs during timeframe 650*c* (shown this early for ease of illustration). An updated silent alarm seed 614*a* is thus created. For subsequent login attempts, the samples 412 from the mobile device 112 will typically match the samples 456 from the server 120. Mismatches will occur, however, if an attacker tries to logon using a counterfeit token having different random bits.

With learning mode complete, silent alarm operation will also resume. Mismatches between received samples 412 and predicted samples 456 can therefore also occur if the mobile device 112 triggers the silent alarm. Here, a silent alarm trigger 660 is seen to occur at the mobile device 112 between timeframes 650*c* and 650*d*. The trigger 660 indicates suspect malicious activity on the mobile device 112, such as tampering. In response to the trigger 660, the mobile device 112 advances the state of the silent alarm value (here, the updated value 610*a*) using the FSF 630, to create a twice updated silent alarm value 610*b*. Thereafter, the mobile device 112 samples the updated value 610*b*.

The server 120, in response to this change at the mobile device 112, will soon issue an alarm (i.e., typically over the course of the next one or two login attempts), as received samples 412 will no longer match predicted samples 456. The server 120 may interpret the mismatch as a true alarm, as the server 120 may recognize that no new token is being initialized. In response to the mismatch, the server 120 may advance the state of its silent alarm value, i.e., by subjecting the updated value 614*a* to the FSF 630, to create a twice updated value (not shown). Over the course of succeeding login attempts, the server 120 can distinguish the cause of the alarm (assuming the server 120 allows logins to continue). For example, if advancing the state of the silent alarm value (via an instance of FSF 630) causes succeeding samples 456 and 412 to match, then the server 120 may conclude that it received a silent alarm trigger 660. If advancing the state of the silent alarm value does not immediately cause samples to match, the server 120 may conclude that the alarm was caused by a soft token clone. It may then wait to receive additional login attempts, in an effort to distinguish legitimate copies from counterfeits.

As with the example shown in FIG. 5, the mobile device 112 can signal the server 120 that its soft token 320 has been cloned. For example, some new extra bits can be combined with the updated silent alarm value 610*b*, via another instance of the FSF 630. For example, an instance of the FSF 630 may take as input both the twice updated silent alarm value 610*b* and the new extra bits, in a manner similar to that shown during timeframe 650*a* with the random bits 310. When the server 120 detects the mismatch, it can be configured either to interpret the mismatch as an alarm or to suspend disposition until the server 120 obtains more information. In some examples, the occurrence of the alarm causes the server 120 to again assume the learning mode. The learning engine 440 is invoked, and it attempts to learn the new extra bits using a technique similar to the one used to learn the original set of random bits 310. If the server can learn the new extra bits quickly (e.g., after a few login attempts), the server 120 may advance the state of its own silent alarm value using the FSF 630 and the learned new extra bits (i.e., in a manner similar to that done for bits 310 during timeframe 650*c*). Thereafter, received samples 412 and predicted samples 456 will match, until another trigger event 660 occurs or another soft token clone is indicated.

Of note, the fact that authorized soft token clones are permitted does not impair the ability of the server 120 to detect counterfeits. Since only a couple of bits are used to distinguish an uncopied soft token from a copied one, the learning process for identifying the new extra bits is much quicker and requires many fewer steps than the learning process used to identify the original set of random bits 310. For example, only three or four logins are needed, on average, to learn two new extra bits. By contrast, many more logins are required to learn the set of random bits 310 (which includes, for example, sixteen bits). If eight logins go by and the server 120 has not yet learned a new random bit pattern, it can be concluded with reasonable certainty that the token supplying the random bits is a counterfeit.

In some examples, the silent alarm bit can be used to implement a monotonic counter on the server 120. The counter may start at zero and be incremented by one each time the server 120 detects an iteration of the FSF 630 on the mobile device 112. In an example, the monotonic counter is implemented as a software counter. In other examples, the monotonic counter is rather implied by the state of the silent alarm value (i.e., it is inherent in the current silent alarm value as that value reflects the number of times the FSF 630 has been iterated since the silent alarm value was the silent alarm seed 610). The mobile device 112 may maintain its own silent alarm count, again as a software counter or inherently. Because the server 120 iterates its FSF 630 to remain synchronized with the mobile device 112 (i.e., so that the received and predicted samples continue to match), the value of the monotonic counter on the server 120 typically equals the value of the monotonic counter on the mobile device 112.

In some examples, the mobile device 112 increments its silent alarm count each time it makes a copy of itself, i.e., it advances its current silent alarm value by subjecting it once again to the FSF 630. The newly created soft token receives the silent alarm value (and count) from the mobile device 112 during the cloning process. Inconsistencies can arise, however, if the mobile device 112 makes two different clones at two different times. In this situation, the first clone has a first silent alarm value (and count), while the second clone, created at a later time, has a subsequent silent alarm value (and count). Thus, a situation is created wherein the different soft tokens are out of sync with one another. In some examples, the server 120 can detect this inconsistency, e.g., by detecting that samples 456 received during some login attempts align with a different silent alarm value than samples acquired from other login attempts. The server 120 may generate alternative values of the samples 456 based on earlier or later silent alarm counts (iterations of the FSF 630). Upon detecting an inconsistency in silent alarm count over different logins, the server 120 may send a message to the user of the mobile device 112 requesting that all copies of the original soft token be updated together.

Figure 7:
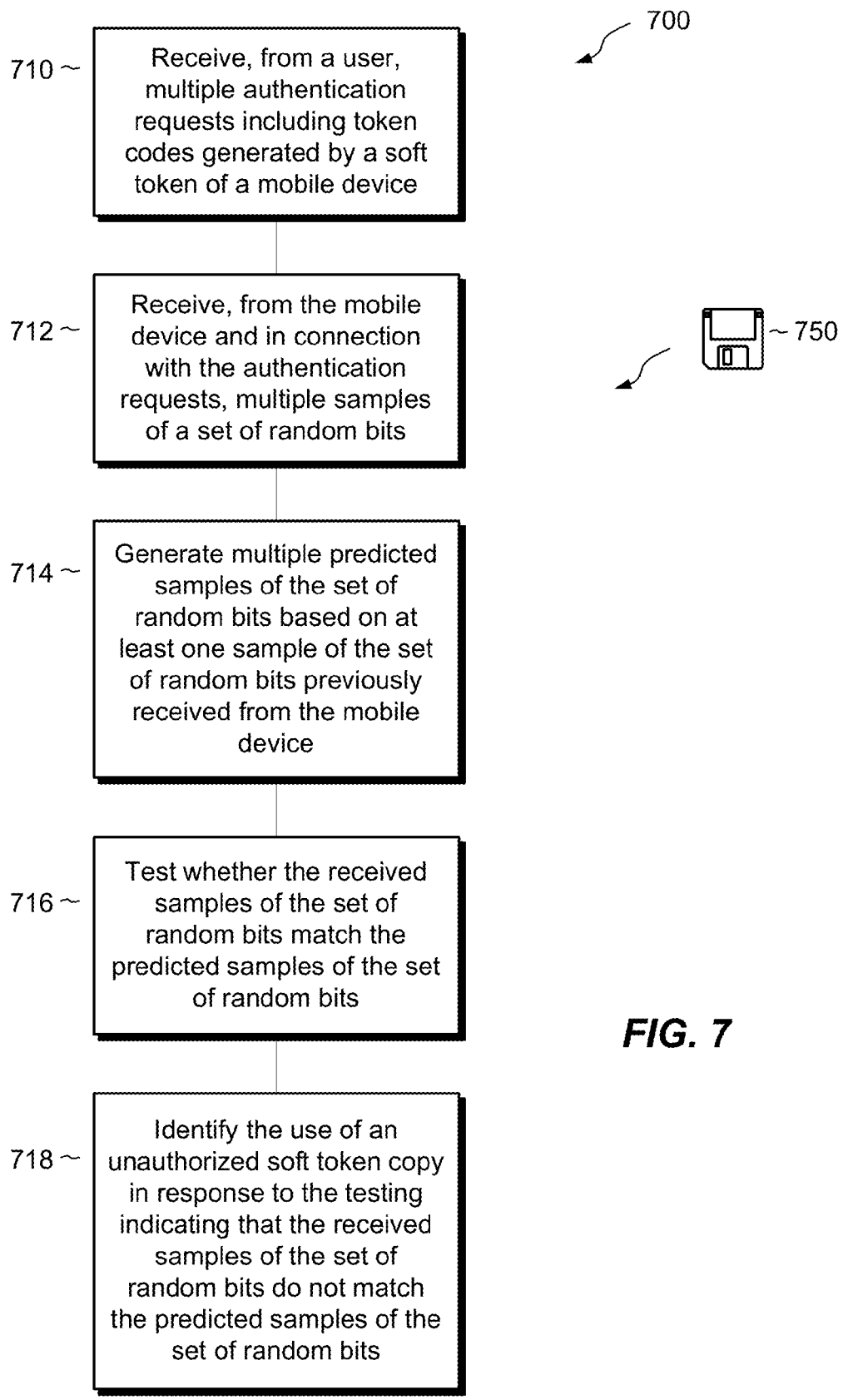
FIG. 7 is a flowchart showing an example process conducted by a server for detecting unauthorized copies of a soft token that runs on a mobile device.
Figure 8:
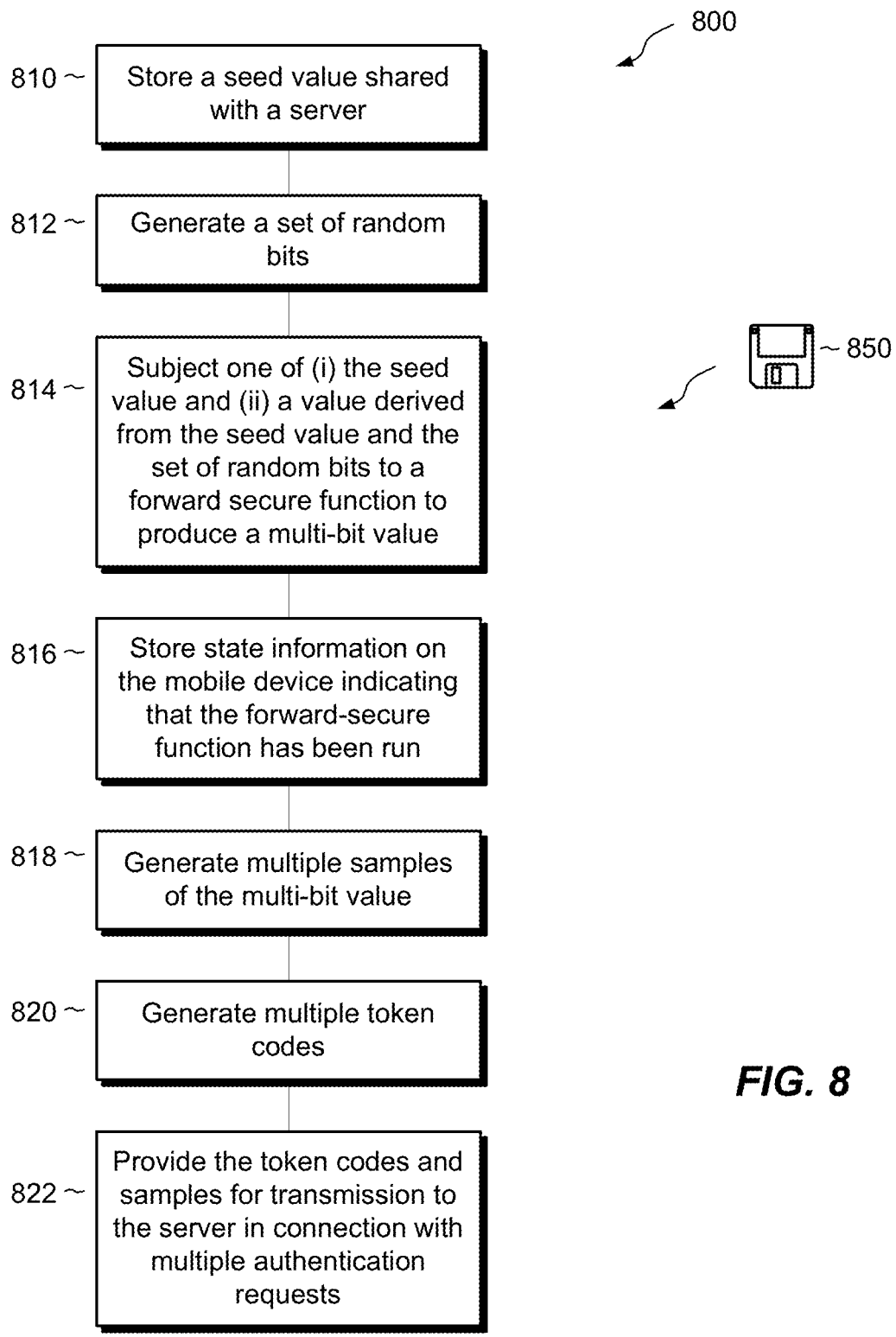
FIG. 8 is a flowchart showing an example process conducted by a mobile device for enabling detection of unauthorized copies of a soft token.

FIGS. 7 and 8 illustrate processes that may be carried out in connection with the computing environment 100 for detecting unauthorized soft token copies. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 7 shows an example process 700 for detecting unauthorized soft token copies. The process 700 may be carried out, for example, on the server 120 by the software constructs 260, which reside in the memory 240 of the server 120 and are run by the set of processors 230.

At step 710, multiple authentication requests are received from a user 110. The authentication requests include token codes 322 generated by a soft token 320 of the mobile device 112. Authentication requests are generally received via a computing machine 114 of the user 110.

At step 712, multiple samples of a set of random bits 310 are received from the mobile device 112 in connection with the authentication requests. In some examples, the samples are received over a high bandwidth channel, such as the network 118 via the communication medium 126, or via the communication medium 116 working in coordination with the computing machine 114. In other examples, samples are received in one or more auxiliary bits, which are embedded in passcodes 414 along with respective token codes 322. In certain examples, the samples are received in an auxiliary bit designated as a silent alarm.

At step 714, the server 120 generates multiple predicted samples (e.g., 356 or 456) of the set of random bits 310. The predicted samples are based on at least one previous sample of the set of random bits 310 received from the mobile device 112. For example, predicted samples 356 may be based on samples 316 previously provided to the server 120. As another example, samples 456 may be based on samples 456 previously received via passcodes 414 and learned by the learning engine 440.

At step 716, the server 120 tests whether the received samples of the set of random bits 310 match the predicted samples of the set of random bits. For example, a comparator software construct 358 may compare a received sample 318 with a predicted sample 356 to test whether the two bits match. As another example, a comparator software construct 458 may compare a received sample 412 with a predicted sample 456 to test whether the two bits match.

At step 718, the server 120 identifies the use of an unauthorized soft token copy in response to the testing indicating that the received samples do not match the predicted samples. In response to the server 120 identifying the use of an unauthorized soft token copy, the server 120 may deny authentication to the user or take some other measure, which may include diverting the user to a specially configured server (e.g., a hacker VPN or honeypot) for observing the user's behavior while ensuring that the user cannot harm the network.

FIG. 8 shows an example process 800 for enabling detection of unauthorized soft token copies. The process 800 may be carried out, for example, on the mobile device 112.

At step 810, the mobile device 112 stores a seed value, which is shared with the server 120. In an example, the seed value may be a silent alarm seed value 610.

At step 812, the mobile device 112 generates a set of random bits using, for example, a random number generator or a myriad of other techniques.

At step 814, the mobile device 112 subjects one of the (i) seed value and (ii) a value derived from the seed value and the set of random bits to a forward secure function to produce a multi-bit value. For example, the mobile device 112 may subject the silent alarm seed value 610 and the set of random bits 310 to an instance of the FSF 630 to produce the updated silent alarm value 610a. As another example, the mobile device 112 may subject a later updated version of the seed 610 (e.g., 610b) to an instance of the FSF 630, along with a couple of extra bits, to indicate that an authorized soft token copy has been made.

At step 816, the mobile device 112 stores state information indicating that the forward secure function has been run. For example, the mobile device 112 may set a flag in non-volatile memory indicating that an instance of the FSF 630 has been run, and thus that the soft token 320 on the mobile device 112 has been initialized. Thereafter, the mobile device 112 can check the flag whenever the soft token 320 is started, to ensure that the soft token 320 is not initialized more than once.

At step 818, the mobile device 112 generates multiple samples of the multi-bit value. An example of such sampling is shown in FIG. 6.

At step 820, the mobile device 112 generates multiple token codes 322.

At step 822, the token codes 322 and samples are provided for transmission to the server 120 in connection with multiple authentication requests. In some examples, the token codes 322 and samples 412 are embedded in respective passcodes 414, which are provided for transmission by displaying the passcodes 414 to the user 110 on a display of the mobile device 112. In other examples, the token codes 322 may be displayed to the user, while the samples are provided to a network device for transmission to the server 120 over the network 118.

A technique has been described for detecting unauthorized copies of a soft token that runs on a mobile device 112. The technique includes generating a set of random bits 310 on the mobile device 112 and providing samples of the set of random bits 310, as well as token codes 322 from the soft token 320, for delivery to a server 120 during authentication requests. The server 120 acquires the set of random bits 310 of the mobile device 112, or learns the set of random bits 310 over the course of multiple login attempts. Thereafter, the server 120 predicts values of the samples of the set of random bits 310 and tests actual samples arriving in connection with subsequent authentication requests. Mismatches between predicted samples and received samples indicate discrepancies between the random bits of the device providing the samples and the random bits of the mobile device, and thus indicate unauthorized soft token copies.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, it is shown and described that a single bit sample of the set of random bits 310 may be conveyed from the mobile device 112 to the server 120 via an auxiliary bit embedded in a passcode 414. However, this is just an example. Alternatively, two or more bits may be conveyed at a time (e.g., via two or more auxiliary bits), with each bit conveying a different sample of the set of random bits. Conveying multiple samples per passcode enables quicker detection of counterfeit tokens as well as quicker learning or random bit patterns by the learning engine 440.

Also, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 750 and 850 in FIGS. 7 and 8). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method for detecting unauthorized copies of a soft token that runs on a mobile device, comprising:
   receiving, from a user, multiple authentication requests including token codes generated by the soft token;
   receiving, from the mobile device and in connection with the authentication requests, multiple samples of a set of random bits;
   generating multiple predicted samples of the set of random bits based on at least one sample of the set of random bits previously received from the mobile device;
   testing whether the received samples of the set of random bits match the predicted samples of the set of random bits; and
   identifying the use of an unauthorized soft token copy in response to the testing indicating that the received samples of the set of random bits do not match the predicted samples of the set of random bits,
   wherein each of the received samples conveys only partial information for identifying the set of random bits.

2. The method of claim 1, wherein receiving multiple samples of the set of random bits includes receiving multiple passcodes generated by the mobile device, each passcode conveying a token code and a sample of the set of random bits.

3. The method of claim 2, further comprising analyzing the samples of the set of random bits received over an initial set of the authentication requests to learn values of the set of random bits, wherein generating multiple predicted samples of the set of random bits takes into account the learned values of the set of random bits.

4. The method of claim 2, wherein the passcodes further include at least one data bit for communicating information from the mobile device, and wherein the method further comprises, in response to the testing indicating a mismatch between a received sample of the set of random bits and a respective predicted sample of the set of random bits, checking the at least one data bit for information indicating whether the mismatch was caused by a copied soft token.

5. The method of claim 2, further comprising storing a seed value that is shared with the mobile device, wherein generating multiple predicted samples of the random bits includes, for each sample, computing the modulo-2 of an inner product of one of (i) the seed value and (ii) a value derived from the seed value with a pseudo random vector having a value that is updated with a pseudo random function for each sample to produce a 1-bit predicted sample.

6. The method of claim 5, wherein generating multiple predicted samples of the random bits further includes subjecting one of (i) the seed value and (ii) a value derived from the seed value to a forward secure function in response to testing indicating that a received sample of the random bits does not match a predicted sample of the random bits, wherein a result of the forward-secure function is used in generating subsequent predicted samples of the random bits.

7. The method of claim 6, further comprising establishing a monotonic count for indicating a number of times one of (i) the seed value and (ii) a value derived from the seed value has been subjected to the forward secure function.

8. The method of claim 7, wherein the monotonic count is indicative of a number of trigger events that have occurred on the mobile device, wherein trigger events indicate (i) detected malicious activity by the mobile device and (ii) that a copy has been made of the soft token.

9. The method of claim 8, further comprising, in response to the testing indicating an additional mismatch between a received sample of the set of random bits and a respective predicted sample of the set of random bits:
   calculating a predicted alternative sample based on a previous iteration of the forward-secure function corresponding to a previous value of the monotonic count; and
   sending a message to a user of the mobile device to synchronize all copies of the soft token in response to predicted alternative samples matching received samples of the set of random bits in authentication requests received after the additional mismatch.

10. The method of claim 9, further comprising in response to the monotonic count reaching a predetermined number, denying subsequent authentication requests received with token codes generated by any copy of the soft token.

11. The method of claim 8, further comprising:
   analyzing samples of the set of random bits received after the testing indicates a mismatch to learn an updated pattern of bits, the presence of which indicates creation of an authorized soft token copy;
   after receiving a number of additional authentication requests, predicting new samples of the updated pattern of bits for authentication requests received after the number of additional authentication requests;
   testing whether the predicted new samples match respective received samples; and
   identifying the use of an unauthorized soft token copy in response to the testing indicating that there is not a match.

12. The method of claim 1, wherein receiving multiple samples of the set of random bits includes receiving a first sample of the set of random bits in connection with a first authentication request and receiving a second sample of the set of random bits in connection with a second authentication request, wherein each of the first sample and the second sample conveys only partial information for identifying the set of random bits.

13. The method of claim 12, wherein testing whether the received samples of the set of random bits match the predicted samples includes testing the first sample of the set of random bits in response to receiving the first authentication request and testing the second sample of the set of random bits in response to receiving the second authentication request.

14. A server for detecting unauthorized copies of a soft token that runs on a mobile device, comprising:
   a set of processors; and memory, coupled to the set of processors, the memory constructed and arranged to store instructions executable by the set of processors,
wherein the set of processors executing instructions from the memory forms a specialized circuit constructed and arranged to:
receive, from a user, multiple authentication requests including token codes generated by the soft token;
receive, from the mobile device and in connection with the authentication requests, multiple samples of a set of random bits;
generate multiple predicted samples of the set of random bits based on at least one sample of the set of random bits previously received from the mobile device;
test whether the received samples of the set of random bits match the predicted samples of the set of random bits; and
identify the use of an unauthorized soft token copy in response to the testing indicating that the received samples of the set of random bits do not match the predicted samples of the set of random bits,
wherein each of the received samples conveys only partial information for identifying the set of random bits.

15. A non-transitory computer readable medium including instructions which, when executed by a set of processors of a server, cause the set of processors to perform a method for detecting unauthorized copies of a soft token that runs on a mobile device, the method comprising:
receiving, from a user, multiple authentication requests including token codes generated by the soft token;
receiving, from the mobile device and in connection with the authentication requests, multiple samples of a set of random bits;
generating multiple predicted samples of the set of random bits based on at least one sample of the set of random bits previously received from the mobile device;
testing whether the received samples of the set of random bits match the predicted samples of the set of random bits; and
identifying the use of an unauthorized soft token copy in response to the testing indicating that the received samples of the set of random bits do not match the predicted samples of the set of random bits,
wherein each of the received samples conveys only partial information for identifying the set of random bits.

16. A method for enabling detection of unauthorized copies of a soft token that runs on a mobile device, comprising:
storing a seed value shared with a server;
generating a set of random bits;
subjecting one of (i) the seed value and (ii) a value derived from the seed value and the set of random bits to a forward secure function to produce a multi-bit value;
storing state information on the mobile device indicating that the forward-secure function has been run;
generating multiple samples of the multi-bit value;
generating multiple token codes; and
providing the token codes and samples for transmission to the server in connection with multiple authentication requests,
wherein each of the samples of the multi-bit value conveys only partial information for identifying the multi-bit value.

17. The method of claim 16, wherein providing the token codes and samples includes combining the token codes and samples to form multiple respective passcodes, and displaying the passcodes on a display of the mobile device.

18. The method of claim 17, further comprising executing a cloning operation to copy the soft token from the mobile device to a second device, wherein the cloning operation includes:
subjecting the multi-bit value to the forward secure function to produce a new multi-bit value;
transmitting the new multi-bit value from the mobile device to the second device; and
transmitting the stored state information from the mobile device to the second device;
wherein generating samples by the mobile device after transmitting the new multi-bit value and the stored state information is performed on the new multi-bit value.

19. The method of claim 17, wherein subjecting the multi-bit value to the forward secure function includes providing the multi-bit value to the forward-secure function along with some extra bits to produce the new multi-bit value.

20. The method of claim 19, further comprising executing a second cloning operation to copy the soft token from the mobile device to a third device, wherein the second cloning operation includes:
subjecting the new multi-bit value to the forward secure function to produce a second new multi-bit value;
transmitting the second new multi-bit value from the mobile device to the third device; and
transmitting the stored state information from the mobile device to the third device;
wherein generating samples by the mobile device after transmitting is performed on the second new multi-bit value.

21. The method of claim 20, wherein subjecting the new multi-bit value to the forward secure function includes providing the new multi-bit value to the forward-secure function along with second extra bits to produce the second new multi-bit value.

22. The method of claim 21, further comprising receiving a message from the server directing a user of the mobile device to synchronize the soft token copies on the mobile device, the second device, and the third device.

* * * * *